(12) United States Patent
Tsvey

(10) Patent No.: US 8,031,045 B1
(45) Date of Patent: Oct. 4, 2011

(54) APPARATUS AND METHOD FOR AN A/B RF REDUNDANT SENSING SWITCH

(75) Inventor: Gennadiy Tsvey, Parkland, FL (US)

(73) Assignee: Viewteq Corp., Boca Raton, FL (US)

( * ) Notice: Subject to any disclaimer, the term of this patent is extended or adjusted under 35 U.S.C. 154(b) by 0 days.

(21) Appl. No.: 12/466,365

(22) Filed: May 14, 2009

(51) Int. Cl.
*G05B 23/02* (2006.01)
*G01R 19/04* (2006.01)

(52) U.S. Cl. .................. 340/3.8; 324/123 R; 324/140 R

(58) Field of Classification Search .................. 333/101, 333/103, 104, 105, 17.1; 455/423; 340/3.8; 330/124 D; 324/123 R, 140 R
See application file for complete search history.

(56) References Cited

U.S. PATENT DOCUMENTS

| | | | |
|---|---|---|---|
| 4,817,094 | A | 3/1989 | Lebizay et al. |
| 5,485,453 | A | 1/1996 | Wahlman et al. |
| 6,798,740 | B1 | 9/2004 | Senevirathne et al. |
| 6,914,878 | B1 | 7/2005 | Lindblom et al. |
| 6,925,578 | B2 | 8/2005 | Lam et al. |
| 7,085,225 | B2 | 8/2006 | Schaller et al. |
| 7,647,044 | B2 * | 1/2010 | Tamminen et al. ........... 455/424 |

* cited by examiner

*Primary Examiner* — Dean Takaoka
(74) *Attorney, Agent, or Firm* — John C. Smith

(57) ABSTRACT

An A/B RF automatic-set-up redundant sensing switch that monitors the relative differences in signal strength of the A and B paths and processes it according to a predetermined logic setting with no manual adjustment. When one of the paths is determined not to match the logic setting, it will switch to the other.

9 Claims, 1 Drawing Sheet

APPARATUS AND METHOD FOR AN A/B RF REDUNDANT SENSING SWITCH

BACKGROUND OF THE INVENTION

1. Technical Field

The present invention relates to redundant sensing switches. In particular, it relates to an improved RF redundant sensing switch which dynamically switches signal sources based on relative differences between those two sources.

2. Background

RF redundant sensing switches are used in a variety of applications to offer back up redundancy of the same signal in the event of a failure of the primary signal, therefore increasing the reliability of the system. To illustrate how RF redundant sensing switches are used, an example will be discussed which illustrates how these switches are used by cable television systems.

In cable television systems, RF redundant sensing switches are often used in the headends and hubs of cable systems. The RF redundant sensing switches offer redundant paths which can be switched based on signal quality. They can be used in conjunction with any active RF device and/or RF path, such as a redundant optical and/or RF ring architecture by switching between the primary and secondary signal sources on the A/B signal paths.

Conventional systems monitor the level of primary signal source. If an error is detected, the RF redundant sensing switch will switch from the primary signal source to the secondary signal source. Typically, an error is detected when the primary signal disappears completely or drops below a predetermined threshold level.

Alternatively, other conventional systems monitor the secondary signal in addition to the primary and switch from the primary to the secondary signal path only when the secondary signal is above a predetermined threshold level. The threshold levels in the prior art systems do not necessarily have to be the same.

SUMMARY OF THE INVENTION

The present invention provides an A/B RF Automatic-set-up redundant sensing switch that monitors the relative differences in signal strength of the A and B paths and processes it according to a predetermined logic setting with no manual adjustment. When one of the paths is determined not to match the logic setting, it will switch to the other.

DESCRIPTION OF THE PREFERRED EMBODIMENT

Figure 1:
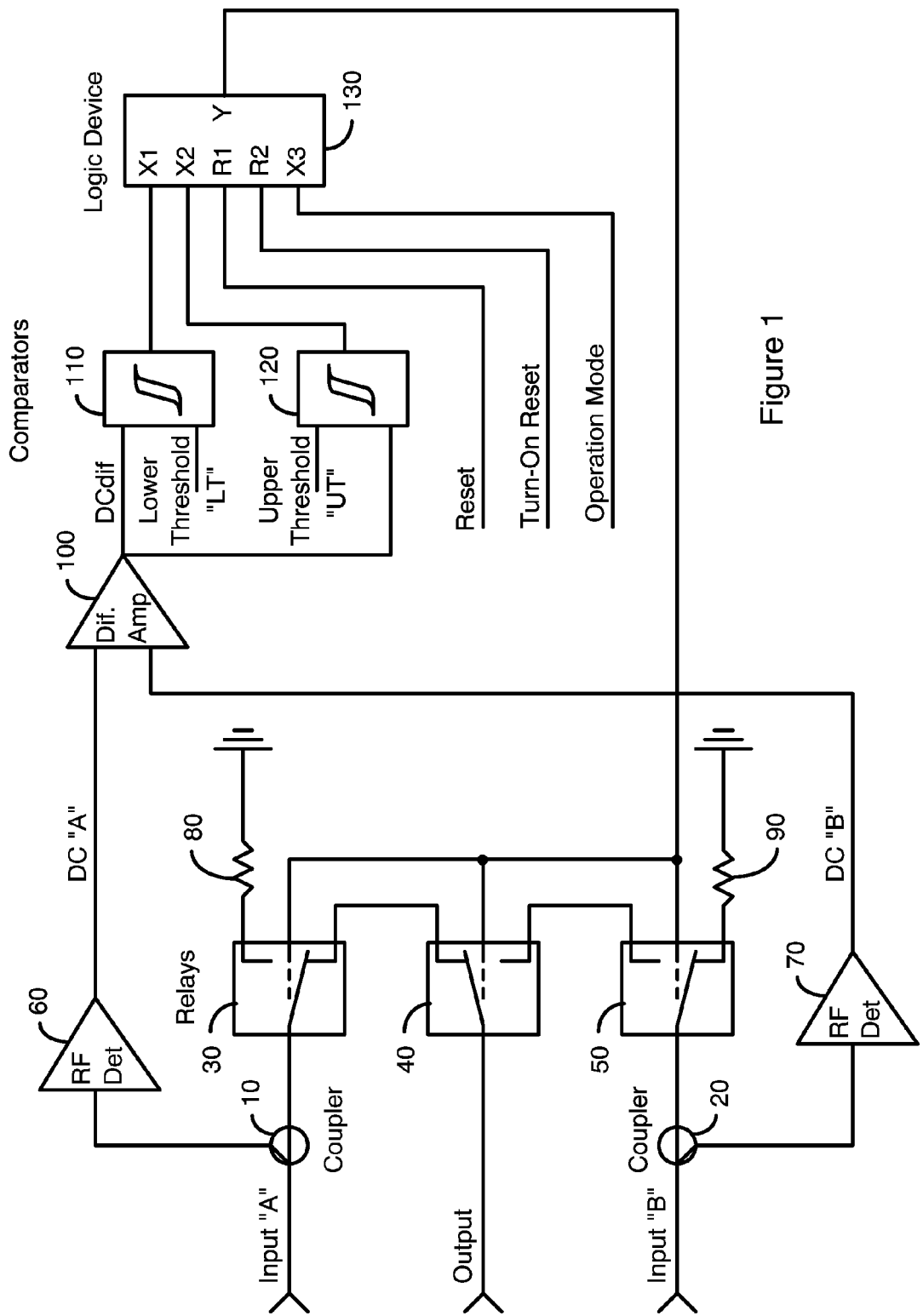
FIG. 1 is a circuit diagram that illustrates a preferred embodiment of the A/B RF redundant sensing switch.

Prior to a detailed discussion of the figures, a general overview of the system will be presented. This invention provides an RF Sensing Redundant Switches that offers a back-up redundancy for any active RF device or RF path as used in redundant optical and RF architecture by switching between primary and secondary signal sources.

Normally, in prior art systems, the signals are monitored at the output of the primary source (source "A") and switch over to the secondary source (source "B") if they detect that the source "A" signal either disappears completely or drops below a predetermined threshold. Some switches also monitor the signal at the output of the secondary source and switch over from "A" source to "B" source only if source "B" signal is above a predetermined threshold which may be different from the source "A" threshold. In some cases, they are used together with two amplifiers positioned either in the same frame as the Switch or separately to monitor state of a primary amplifier and to switch over to a secondary amplifier in case of the former amplifier failure.

In most cases the signals from sources "A" and "B" (with or without amplifiers) are identical and the Redundant Switch provides improved reliability of the system through redundancy by switching between sources (or signal paths) in case of a detected primary (source "A") failure. The Switch setup involves setting reference levels for source "A" alone or both sources "A" and "B." Usually the procedure is performed by an installation technician and consists of several steps, the main ones being assembling (pre-combining) all analog and/or digital channels for paths "A" and "B," connecting them to the Switch's inputs, and adjusting both reference levels for "A" and "B." Depending on the manufacturer, the reference level adjustment procedure may include spinning a potentiometer screw using light-emitting diodes (LED) on the Switch's panel as an indication of the signal being below or above the reference level (analog setup), or pressing various buttons on the front panel (digital setup) watching LED bars, or using a voltmeter to measure certain voltages that indicate if the signal is below or above the reference level.

Known systems measure the output levels of each amplifier individually and then compare them to a preset reference level. The preset reference level may be different for each amplifier. If the RF level coming from the output of an amplifier drops by more than a specified value, for example 2.5-3 dB, it will fall below the reference level and will indicate a faulty condition. At that point, the corresponding indicator on the front panel will be activated. If this condition is detected at the output of amplifier "A," and the RF level from amplifier "B" is still above the threshold, the signal path will be switched so that the output will be connected to amplifier "B." The operator can then replace or troubleshoot amplifier "A" while the signal is routed through "B." The reference levels have to be set only when all other adjustments (pads and equalizers) have been completed and full channel loading is present.

Setting reference levels is typically time consuming, and maladjustments on the technician's part may lead to the incorrect set levels which in turn may prevent the switch from functioning properly in the case of failure of "A" source and reduced reliability of the whole system. Also, when the number of channels combined and fed into the Switch inputs changes or their levels change, the reference levels may need to be changed. This creates another potential for errors in setting the levels and increases labor cost.

Different standards are used in different parts of the world. For example, in the U.S. the return path is 5-42 MHz and in other parts of the world it is 5-65 MHz. The signal levels going through the Switch may vary significantly in normal operation or can disappear completely at times when there are no users of certain services on-line. This signal level variance does not indicate any failures, but may mislead the Switch (when the signal drops below the preset level) into falsely and unnecessarily switching between "A" and "B." One way of reducing this is to set the reference levels far below the minimum level of the varying signal may be in normal operation. However, this may prevent the Switch from operating correctly if the levels are too low, and it does not solve the problem if the signals disappear completely in normal operation.

The invention herein is a Switch that does not require setting reference levels and it may function correctly in the situations where signals may vary in levels greatly or disappear completely during normal operation. This provides a substantial improvement over the prior art by avoiding errors generated by prior art system architecture.

Instead of comparing sources "A" and "B" levels to their own preset reference levels, this new Switch compares the "A" and "B" sources to each other as dynamic reference levels using source "A" signal as a reference for source "B" and visa versa, therefore redundancy can be maintained even when there are no signals. Typically, both source levels are close to each other as an initial condition. If the Switch's logic finds that the difference between levels of the "A" and "B" signals is within a predetermined window (i.e., a predetermined range) it then decides that no fault is present and keeps source "A" connected to its output. In the preferred embodiment, the width of this window is preset at the factory. Since the difference between signal levels of the "A" and "B" sources does not depend on their absolute levels, the Switch may operate normally without any field adjustable reference levels, which eliminates any chances for errors during field setups and eliminates labor and time needed by a technician to set up levels, and eliminates a necessity to readjust levels if the channel line-up changes. A dynamic reference level feature also allows the Switch to operate properly if the signals vary in levels during normal operation or drop off completely if there are no users for a particular service on-line at any time.

The Switch monitors the difference between "A" and "B" levels and switches from "A" to "B" when, for example, "A"–"B" exceed a predetermined factory set upper limit (which means that signal "A" is larger than signal "B") or goes below certain factory set lower limit (which means that signal "A" is lower than signal "B"). In an alternative embodiment, it may switch only when signal "A" goes lower than signal "B" and give only an indication of a possible fault without switching if signal "A" is larger than signal "B." And when there are no signals from both sources the dynamic reference level feature still provides that the difference between "A" and "B" falls within the window and allow maintains redundancy. Those skilled in the art will recognize that the foregoing embodiment is used for illustrative purposes only, and other configurations and switching options may be used.

Those skilled in the art will recognize that the foregoing example uses values that may vary depending on the particular system and application in question.

Having discussed the features and advantages of the invention in general, we now turn to a more detailed discussion of the FIGURE.

FIG. 1 illustrates a circuit diagram of a preferred embodiment of the invention. It consists of Input "A," Input "B," output connectors, two directional couplers 10, 20, two RF detectors 60, 70 which may have either linear or logarithmic transfer characteristics, three single throw double pole relays 30, 40, 50 (i.e., the three relay arrangement provides better off-isolation and also allows to terminate switched off inputs to a termination device 80, 90. Alternatively, the circuit may consist of a single relay with proper contact arrangement to accomplish the same purpose.) A differential amplifier 100 that takes outputs from RF detectors, two single threshold comparators 110, 120 (alternatively, the comparators can be substituted with a single "window" comparator) that compare the output from the differential amplifier 100 to two factory preset thresholds, and a logic device 130 which may be either a programmable microprocessor/microcontroller, or a fixed (hardwired) logic arrangement. The logic device 130 accepts outputs from two comparators 110, 120 and other system control signals.

The primary signal is normally connected to Input "A" and the secondary signal is normally connected to Input "B." The signals pass through their corresponding directional couplers 10, 20, where a small portion of each signal is directed to their associated RF Detectors 60, 70 respectively, and then through relays 30, 50 respectively. Relay 30 contacts connect pins 1, 3, the primary signal further passes on to relay 40 and through its contacts 3 and 1 to the system's output. The secondary signal gets terminated on its termination device 90, which could be a simple resistive termination (e.g., 75 or 50 Ohms). The termination of the secondary signal on the matched terminator provides proper operating conditions for this input and prevents the signal from reflecting back. If the signal reflects back from a non-terminated input it may distort signal coupled to the RF Detector and lead to improper operating conditions for the switching circuitry. If both "A" and "B" signals are similar in RF power, then the DC levels (DC "A" and DC "B") coming from both RF Detectors to "+" and "–" inputs of the Differential Amplifier 100 will also be similar, but not necessarily the same, in voltage value. The Differential Amplifier 100 subtracts one DC level from another and a small voltage DCdif proportional to the difference in the DC levels from RF Detectors will appear on its output. Because of variations in parameters of RF Detectors and Couplers this small DCdif voltage may be either positive or negative. However, depending on the relative value of DC "A" and DC "B," it will not change significantly if both input signals will vary in amplitude and will stay practically constant. DCdif voltage from the output of Differential Amplifier 100 is further fed to inputs of two single threshold comparators 110 and 120 in such manner that it comes to "+" input of the comparator 110 and to the "–" input of comparator 120. A constant voltage is applied to the "–" input of comparator 110 ("Lower Threshold—LT") and "+" input of comparator 120 ("Upper Threshold—UT"). The values of these voltages are preset at the factory and represent a "window" with upper and lower limits. Normally, these values are chosen such that the DCdif voltage is somewhere in-between LT and UT, preferably being an average of these two voltages. If RF Detectors 60 and 70 are logarithmic detectors then the LT and UT may be directly calibrated in dB and may, for example, be set like +0.3 V and –0.3 dB representing +/–3 dB away from DCdif. Two comparators 110 and 120 may be replaced by a single "window" comparator that would accomplish the same task. In normal operation when both signals are present on both inputs "A" and "B" and DCdif stays in-between LT and UT comparator 110 will have logic "1" at its output (since DCdif>LT) and comparator 120 will also have logic "1" since DCdif<UP. If, for example, input "B" level exceeds input "A" level by more than 3 dB then DCdif will decrease in value and go below the value of LT. This situation represents potential problem with the primary source connected to input "A." Comparator 110 will change its output state from logic "1" to logic "0" while comparator 120 will still have "1" at its output. If, for example, input "A" level exceeds input "B" level by more than 3 dB then DCdif will increase in value and go above the value of UT. This situation represents a potential problem with the secondary source connected to input "B." Comparator 120 will change its output state from logic "1" to logic "0" while comparator 110 will still have "1" at its output. If both input levels either increase or decrease simultaneously by the same value, the value of DCdif will stay approximately the same and stay within levels of LT and UT. This condition means that it is the signal that is changing and not the equipment problem, which will effectively eliminate false switching. Both comparators may utilize hysteresis loop at their outputs and/or time delay to prevent "ringing" (or fast switching back and forth) if the signal hovers around the threshold.

Logic levels from comparators 110 and 120 are further fed into "X1" and "X2" inputs of a Logic Device 130. In normal operation its output "Y" is logic "0" meaning that no switching voltage is supplied to relays 30, 40 and 50 and the signal from input "A" (primary source) passes to the system's output. A "Turn-On Reset" input R2 may be utilized to reset the logic device 130 into its "normal" state when the system is powered up. Optionally, output "Y" may be made latching and another "Reset" input R1 may be utilized to manually (or remotely) reset the system into "normal" state after the system had switched to the secondary source upon detecting a failure on the primary source and later the failure of the primary source was repaired.

Table 1, below, is the "truth table" for logic device 130.

| Condition | R2 | X1 | X2 | Y |
|---|---|---|---|---|
| Normal operation | 0 | 1 | 1 | 0 |
| Possible secondary source failure | 0 | 1 | 0 | 0 |
| Possible primary source failure | 0 | 0 | 1 | 1 |
| No power | 0 | 0 | 0 | 0 |
| Reset applied | 1 | X1 | X2 | 0 |

Another option includes the capability to switch between manual/remote reset and automatic reset in which case the logic device 130 will have optionally another input "X3" that sets its operating mode to manual/remote reset when, for example, X3 level is logic"0" or automatic reset when its level is logic "1." In case of automatic reset, the logic device 130 resets itself automatically without the necessity to apply any reset signals to R1 when the failure of the primary source is repaired (i.e. both X1 and X2 are logic "1" again).

Optionally an additional input may be provided on the logic device 130 (not shown in the FIG. 1) to allow manual switching from input "A" to input "B" or vice versa independently from any fault condition on the system's inputs (manual override).

When the logic device 130 switches its output "Y" from logic "0" to logic "1" a voltage is applied to the relays 30, 40, 50 and the system switches the secondary source to its output while terminating the primary source on its termination device 80.

While the invention has been described with respect to a preferred embodiment thereof, it will be understood by those skilled in the art that various changes in detail may be made therein without departing from the spirit, scope, and teaching of the invention.

I claim:

1. An RF automatic-set-up redundant sensing switch, comprising:
   a first signal input for a first signal and a second signal input for a redundant second signal;
   comparator means to compare the relative strength of the first and second signals to one another;
   a signal output, the signal output outputting either the first signal or the second signal;
   selection means to select and output either the first signal or the second signal based on the relative strength of the first and/or second signal to one another;
   a differential amplifier that inputs values for the first and second signals, and outputs a value indicating the difference between the first and second signal;
   a first comparator that inputs the output of the differential amplifier and compares it to a predetermined lower threshold value, the first comparator outputs a signal that indicates when the output of the differential amplifier is above the lower threshold value;
   a second comparator that inputs the output of the differential amplifier and compares it to a predetermined upper threshold value, the second comparator outputs a signal that indicates when the output of the differential amplifier is below the upper threshold value; and
   a logic circuit that inputs the output of the first and second comparators, the logic circuit switches the output signal between the first signal to the second signal unless the differential amplifier is below the lower threshold or above the upper threshold;
   whereby the sensing switch outputs the selected first or second signal having the best signal strength.

2. A switch, as in claim 1, wherein:
   a first RF detector that detects the strength of the first signal and outputs the value for the first signal to the differential amplifier; and
   a second RF detector that detects the strength of the second signal and outputs the value for the second signal to the differential amplifier.

3. A switch, as in claim 1, wherein:
   the first signal is input to a first relay and the second signal is input to a second relay;
   the first relay is activated to output the first signal, and the second relay is deactivated to prevent output of the second signal, when the logic circuit determines that the first signal is inside the preselected window; and
   the second relay is activated to output the second signal, and the first relay is deactivated to prevent output of the first signal, when the logic circuit determines that the first signal is outside the preselected window.

4. An RF automatic-set-up redundant sensing switch, comprising:
   a first signal input for a first signal and a second signal input for a redundant second signal;
   comparator means to compare the relative strength of the first and second signals to one another;
   a signal output, the signal output outputting either the first signal or the second signal;
   selection means to select and output either the first signal or the second signal based on the relative strength of the first and/or second signal to one another;
   the selection means continues to output the selected first or second signals if both the first or second signal levels have decreased or ceased;
   a differential amplifier that inputs values for the first and second signals, and outputs a value indicating the difference between the first and second signal;
   a first comparator that inputs the output of the differential amplifier and compares it to a predetermined lower threshold value, the first comparator outputs a signal that indicates when the output of the differential amplifier is above the lower threshold value;
   a second comparator that inputs the output of the differential amplifier and compares it to a predetermined upper threshold value, the second comparator outputs a signal that indicates when the output of the differential amplifier is below the upper threshold value; and
   a logic circuit that inputs the output of the first and second comparators, the logic circuit switches the output signal between the first signal to the second signal unless the differential amplifier is below the lower threshold or above the upper threshold;

whereby the sensing switch outputs the selected first or second signal having the best signal strength.

5. A switch, as in claim 4, wherein:

a first RF detector that detects the strength of the first signal and outputs the value for the first signal to the differential amplifier; and a second RF detector that detects the strength of the second signal and outputs the value for the second signal to the differential amplifier.

6. A switch, as in claim 4, wherein:

the first signal is input to a first relay and the second signal is input to a second relay;

the first relay is activated to output the first signal, and the second relay is deactivated to prevent output of the second signal, when the logic circuit determines that the first signal is inside the preselected window; and the second relay is activated to output the second signal, and the first relay is deactivated to prevent output of the first signal, when the logic circuit determines that the first signal is outside the preselected window.

7. An RF automatic-set-up redundant sensing switch, comprising:

a first signal input for a first signal and a second signal input for a redundant second signal;

comparator means to compare the relative strength of the first and second signals to one another;

a signal output, the signal output outputting either the first signal or the second signal;

selection means to select and output either the first signal or the second signal based on the relative strength of the first and/or second signal to one another;

means to determine if the difference between the first and second signals falls within a preselected window;

means to switch between the first and second signals when the difference between the first and second signals falls outside of the predetermined window;

a differential amplifier that inputs values for the first and second signals, and outputs a value indicating the difference between the first and second signal;

a first comparator that inputs the output of the differential amplifier and compares it to a predetermined lower threshold value, the first comparator outputs a signal that indicates when the output of the differential amplifier is above the lower threshold value;

a second comparator that inputs the output of the differential amplifier and compares it to a predetermined upper threshold value, the second comparator outputs a signal that indicates when the output of the differential amplifier is below the upper threshold value; and a logic circuit that inputs the output of the first and second comparators, the logic circuit switches the output signal between the first signal to the second signal unless the differential amplifier is below the lower threshold or above the upper threshold;

whereby the sensing switch outputs the selected first or second signal having the best signal strength.

8. A switch, as in claim 7, wherein:

a first RF detector that detects the strength of the first signal and outputs the value for the first signal to the differential amplifier; and a second RF detector that detects the strength of the second signal and outputs the value for the second signal to the differential amplifier.

9. A switch, as in claim 7, wherein:

the first signal is input to a first relay and the second signal is input to a second relay;

the first relay is activated to output the first signal, and the second relay is deactivated to prevent output of the second signal, when the logic circuit determines that the first signal is inside the preselected window; and the second relay is activated to output the second signal, and the first relay is deactivated to prevent output of the first signal, when the logic circuit determines that the first signal is outside the preselected window.

\* \* \* \* \*